(12) United States Patent
Yaor

(10) Patent No.: US 7,286,369 B2
(45) Date of Patent: Oct. 23, 2007

(54) PAD AND ELECTRONIC DEVICE EMPLOYING THE SAME

(75) Inventor: Chun-Yi Yaor, Taipei (TW)

(73) Assignee: Inventec Corporation (TW)

(*) Notice: Subject to any disclaimer, the term of this patent is extended or adjusted under 35 U.S.C. 154(b) by 312 days.

(21) Appl. No.: 11/033,315

(22) Filed: Jan. 12, 2005

(65) Prior Publication Data
US 2006/0151204 A1 Jul. 13, 2006

(51) Int. Cl.
*H05K 7/18* (2006.01)
(52) U.S. Cl. ............... 361/801; 361/770; 361/742; 361/758
(58) Field of Classification Search ............ 174/260, 174/261; 361/760, 741, 756
See application file for complete search history.

(56) References Cited

U.S. PATENT DOCUMENTS 5,879,115 A * 3/1999 Medal ................ 411/82
6,603,656 B2 * 8/2003 Cho et al. ................ 361/683
2002/0043608 A1 * 4/2002 Nakata et al.

* cited by examiner

*Primary Examiner*—Dean A. Reichard
*Assistant Examiner*—Yuriy Semenenko
(74) *Attorney, Agent, or Firm*—Bacon & Thomas, PLLC

(57) ABSTRACT

The present invention discloses a pad and an electronic device employing the same, wherein the pad has an accommodating groove, a ditch disposed around the periphery of the accommodating groove, and at least one guiding groove disposed between the ditch and the accommodating groove, and one end of the guiding groove coupled to the ditch and the other end coupled to the accommodating groove; such that if a glue for attaching the pad with an electronic device is melted by heat, the melted glue will flow into the ditch, and thus can achieve the effects of preventing the melted glue flowing out from the body as well as guiding and collecting the melted glue within the body.

3 Claims, 3 Drawing Sheets

PAD AND ELECTRONIC DEVICE EMPLOYING THE SAME

FIELD OF THE INVENTION

The present invention generally relates to a pad, and more particularly to a pad employed by an electronic device having a ditch on a body thereof for guiding and collecting glue melted by heat within the body

BACKGROUND OF THE INVENTION

Personal computers lead to a fast development of information products, and the demand for information products grows unceasingly every year. As the information industries develop and advance, related electronic products tend to be developed in a high-frequency high-speed data processing model and a light, thin, short and compact stylish design becomes the mainstream of electronic products. Although the reduced model brings a smaller size to the internal components and chips, the design also causes a higher density of heat sources of the electronic components. The heat dissipation for related electronic products and the way of controlling the influence of the produced heat to electronic products are the determining factors of the product stability for electronic product manufacturers.

In early stage, the design of internal circuits in a computer is simpler; the computer has less application programs and a slower operating speed; and thus the operations of a computer system will not run out of order due to the heat produced. However, the present computers require higher memory capacity and faster computational speed for powerful functions, and thus the operating temperature of the system is increased accordingly. The size of chips installed in a computer system gradually gets smaller, and the density of the heat sources of electronic components becomes higher. The design and appearance of the computer system is getting smaller according to the trend and convenience, and the hot air inside the chassis usually cannot be discharged successfully, and thus will cause a large temperature rise to the whole computer and affect the components and structure of the computer.

A prior-art pad is installed at the bottom surface of a notebook computer, such that when the notebook computer is placed on a disposing surface, the pad provides a buffer for the notebook computer for a reaction exerted on the disposing surface so as to avoid damaging the electronic components in the notebook computer due to collisions. One side of the pad is in contact with the disposing surface and the other side is attached onto the bottom surface of the notebook computer by glue. However, the foregoing heat generating problem not only produces a high temperature to the electronic components, but also affects every part of the notebook computer. Therefore, the glue will be melted easily due to a high temperature produced by the notebook computer. Furthermore, the weight of the notebook computer and the force from the user's palm and the key strokes of the notebook computer squeeze the melted glue to one side of the pad and the disposing surface, and thus the pad and disposing surface adhere dust and dirt easily. It is not easy to clean the dust and dirt since the composition of the glue is very special. As a result, the disposing surface of the notebook computer is contaminated by the remains of the glue, so that when the melted glue flows out excessively, the cohesion between the bottom surface and the pad will no long exist and cause the pad to fall off.

To solve the aforementioned problem, a prior art changes the composition of the glue, so that the glue can stand a higher temperature. However, the heat resisting effect of the glue is not as good after a long use of the notebook computer. Furthermore, it is not easy to change the composition of the glue to achieve a higher heat resisting effect. Therefore, there is a need for a simple and cost-saving method to prevent the glue from flowing out.

SUMMARY OF THE INVENTION

In view of the shortcomings of the prior art, the inventor of the present invention based on years of experience in the related industry to conduct extensive researches and experiments to overcome the shortcomings of the prior art and finally invented a pad and an electronic device employing the same in accordance to the present invention.

Therefore, it is an objective of the present invention to provide a pad comprising a body, an accommodating groove, a ditch and at least one guiding groove; wherein one side of the body is attached to the bottom surface by glue; the accommodating groove is disposed on another side of the body; the accommodating groove is surrounded by the ditch; the guiding groove is disposed between the ditch and the accommodating groove. One end of the guiding groove is coupled to the ditch and the other end is coupled to the accommodating groove. If the glue is melted into a liquid form by the heat, the melted glue will flow into the ditch and then flow from one end of the guiding groove to another end until it flows into the accommodating groove. The present invention can prevent the glue from flowing out due to the heat.

Another objective of the present invention is to provide an electronic device having a pad, and the electronic device at its bottom surface comprises a body; a ditch surrounding a lateral side of the body, and one side of the body being attached onto the bottom surface by glue and the other side being in contact with a disposing surface; a body protective frame disposed at the periphery of the body, and one end of the body protective frame being coupled to the bottom surface, another end being extended towards the disposing surface, and the length of the body protective frame is shorter than the body, which allows the body to extend out of the body protective frame, such that when an electronic device is placed on the disposing surface, a gap is maintained between the body protective frame and the disposing surface. Therefore, if the glue is melted by the heat, the ditch prevents the melted glue flowing out from the gap between the body and the body protective frame, and the guiding groove guides and collects the melted glue within the body.

The above and other objects, features and advantages of the present invention will become apparent from the following detailed description taken with the accompanying drawings.

DETAILED DESCRIPTION OF THE PREFERRED EMBODIMENTS

Figure 1:
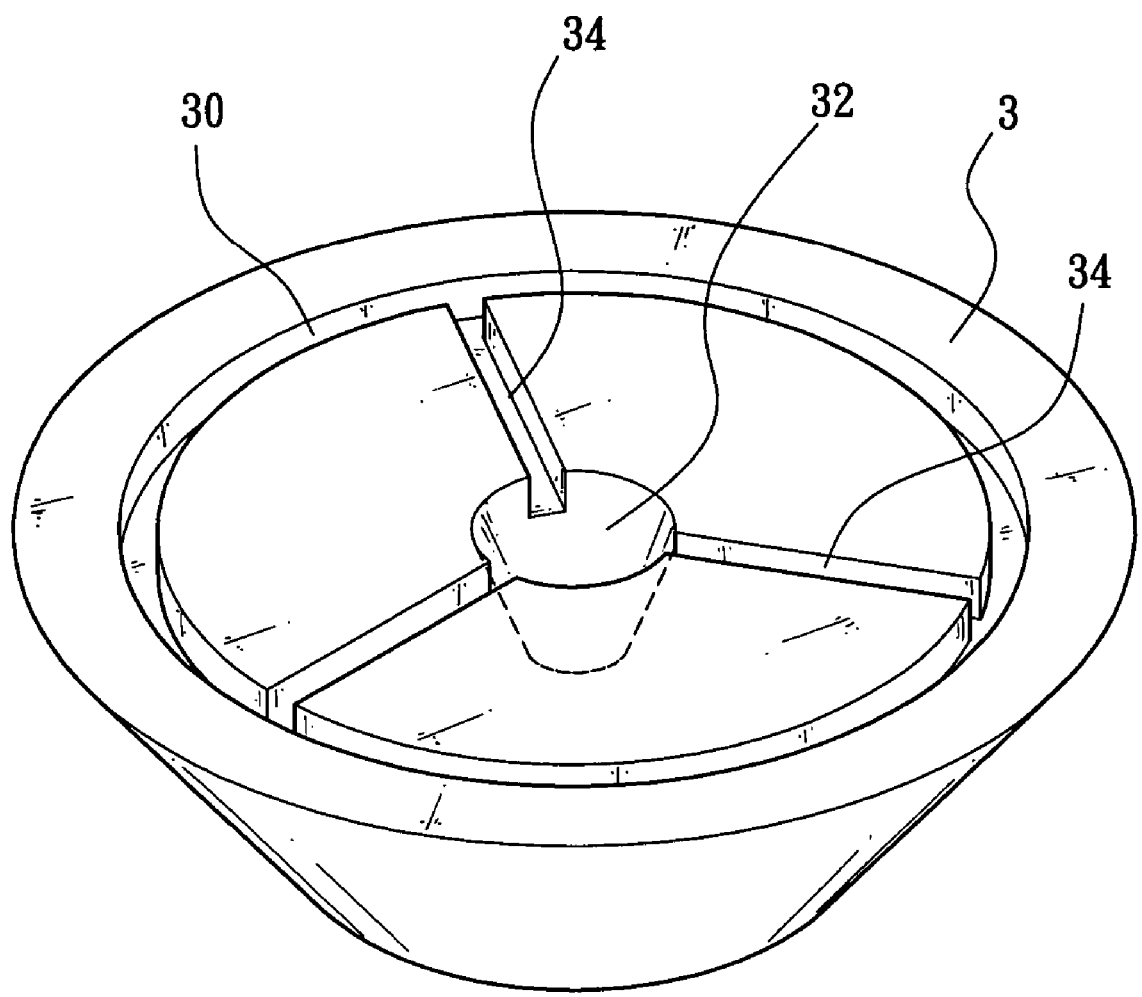
FIG. 1 is a perspective view of the body of the present invention.
Figure 2:
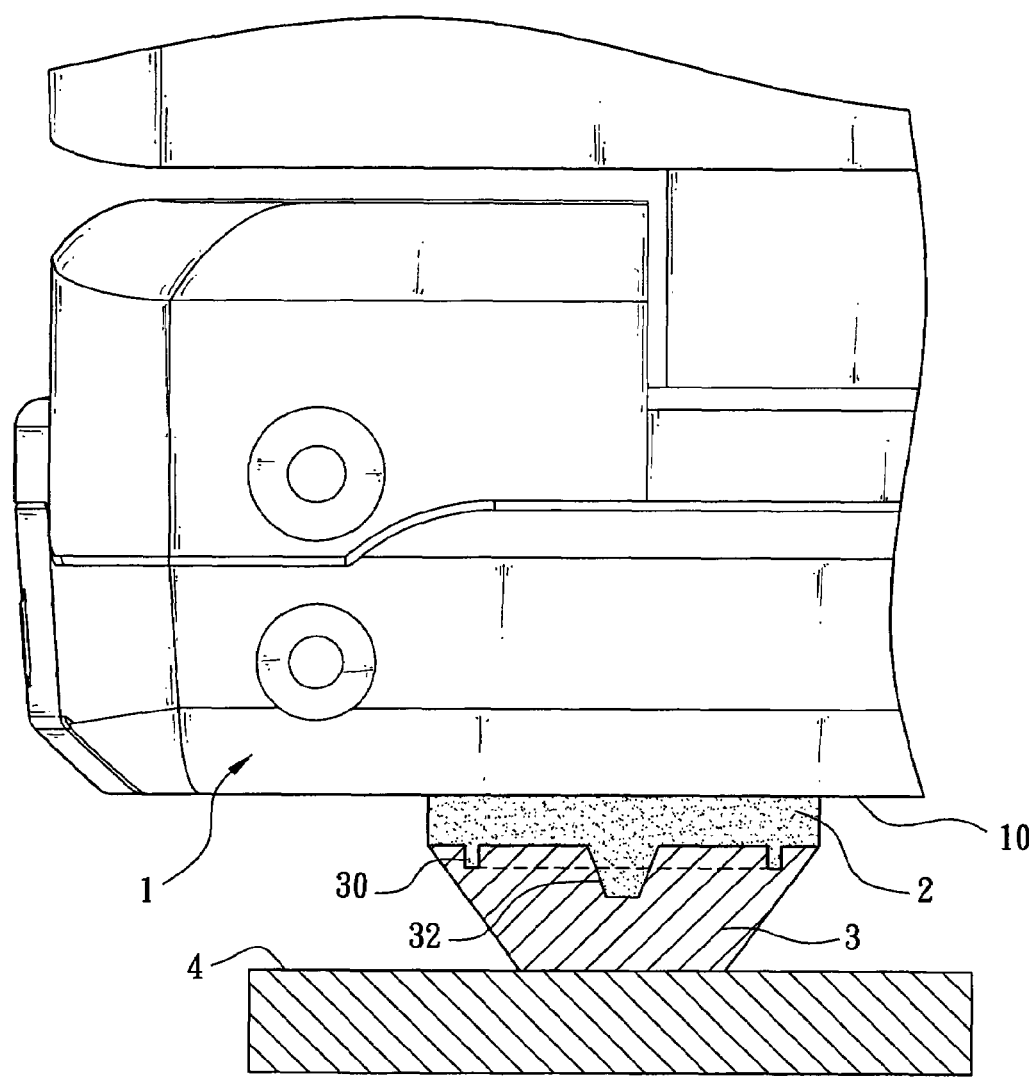
FIG. 2 is a schematic lateral cross-sectional view of the body of the present invention.

Please refer to FIGS. 1 and 2 for a pad in accordance with the present invention. The pad comprises a body 3, an accommodating groove 32 disposed on one side of the body 3, a ditch 30 disposed at the periphery of the accommodating groove 32 of the body 3, and at least one guiding groove 34 disposed between the ditch 30 and the accommodating groove 32, wherein one end of the guiding groove 34 is coupled with the ditch 30 and the other end is coupled to the accommodating groove 32, such that one side of the body 3 is attached onto a bottom surface 10 of an electronic device 1 by a glue 2 and the other side is in contact with a disposing surface 4. If the glue 2 is melted by heat, the melted glue 2 in a liquid form flows into the ditch 30 and then through the guiding groove 34 into the accommodating groove 32 so as to prevent the glue 2 from flowing out when heated and effectively prevent the disposing surface from being contaminated.

Figure 3:
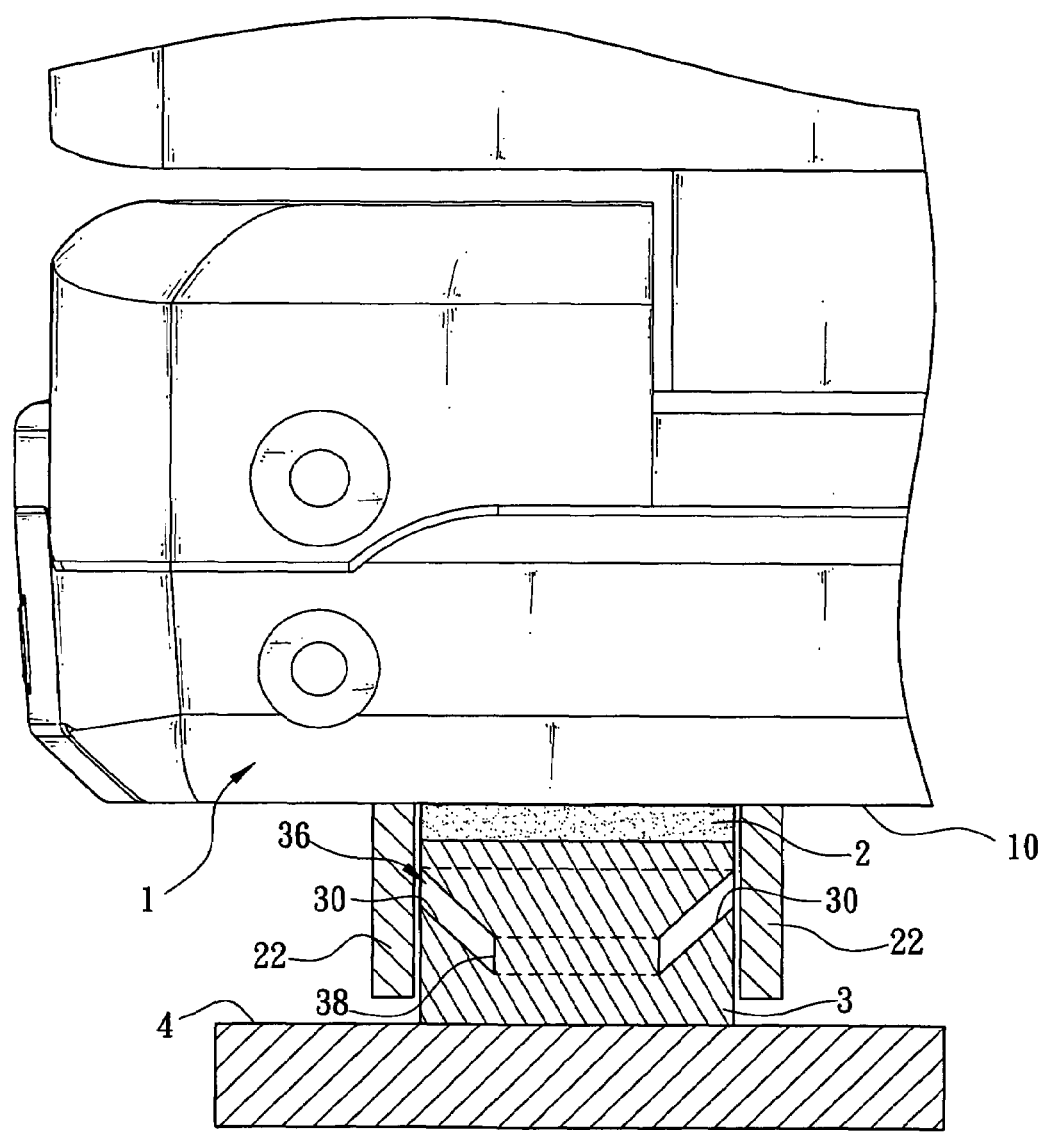
FIG. 3 is another schematic lateral cross-sectional view of the body of the present invention.

Please refer to FIG. 3 for an electronic device employing a pad in accordance with the present invention. The electronic device 1 on its bottom surface 10 comprises a body 3 and a body protective frame 22; wherein one side of the body 3 is attached onto the bottom surface 10 by a glue 2 and the other side of the body 3 is in contact with a disposing surface 4; a ditch 30 surrounds a lateral side of the body 3, and one end of the body protective frame 22 is coupled to the bottom surface 10 and the other end is extended to the disposing surface 4, and the length of the body protective frame 22 is shorter than the body 3, such that the body 3 can extend out of the body protective frame 22. If the electronic device 1 is placed on the disposing surface 4, a gap is maintained between the body protective frame 22 and the disposing surface 4. Therefore, if the glue 2 is melted by heat, the ditch 30 of the body 3 can prevent the glue 2 flowing out from the gap between the body 3 and the body protective, and can guide and collect the melted glue 2 within the ditch 30.

Please refer to FIG. 3 for the preferred embodiment of the present invention again. The ditch 30 comprises an open section 36 and a groove bottom 38; wherein the open section 36 is disposed at the same side of the ditch 30 and a lateral side of the body 3; the groove bottom 38 is disposed inside the body 3; and the bottom groove 38 is closer to another side of the body 3 than the open section 36. If the glue 2 is melted into a liquid form by the heat, the melted glue 2 will flow out from the gap between the body 3 and the body protective frame 22 to another side of the body 3. When the glue 2 flows to the open section 36, the glue 2 will flow into the ditch 30 along the open section 36 since the ditch 30 is tilted inwardly towards the body 3, such that the glue 2 flows into the groove bottom 38 for accommodating the glue 2 and preventing the melted glue 2 from flowing out a well as effectively preventing the disposing surface 4 from being contaminated.

While the invention herein disclosed has been described by means of specific embodiments, numerous modifications and variations could be made thereto by those skilled in the art without departing from the scope and spirit of the invention set forth in the claims.

What is claimed is:

1. A pad having a body, and said body on one side surface comprising:
   an accommodating groove disposed at the center of said side surface;
   a ditch disposed on said side surface at a position around the periphery of said accommodating groove; and
   at least one guiding groove disposed on said side surface at a position between said ditch and said accommodating groove, wherein one end of said guiding groove is coupled to said ditch and the other end being is coupled to said accommodating groove.

2. An electronic device employing a pad, and said electronic device on its bottom surface comprising:
   a body with one side surface coupled to said bottom surface by glue and the other side in contact with a disposing surface, and having a ditch disposed at an outer peripheral surface of said body; and
   a protective frame, disposed at the periphery of said body, wherein one end of said body protective frame is coupled to said bottom surface and the other end extends towards said disposing surface, the length of said body protective frame is shorter than said body, and said body extends out from said body protective frame so as to maintain a gap between said body protective frame and said disposing surface.

3. The electronic device of claim 2, wherein said ditch comprises:
   an open section, disposed at the seam of said ditch and the outer peripheral surface of said body; and
   a groove bottom disposed inside said body at a position more proximate to said opening than another side of said body.

* * * * *